(No Model.)
W. M. CAMPBELL.
PROPELLER SHAFT BEARING.
No. 563,134. Patented June 30, 1896.
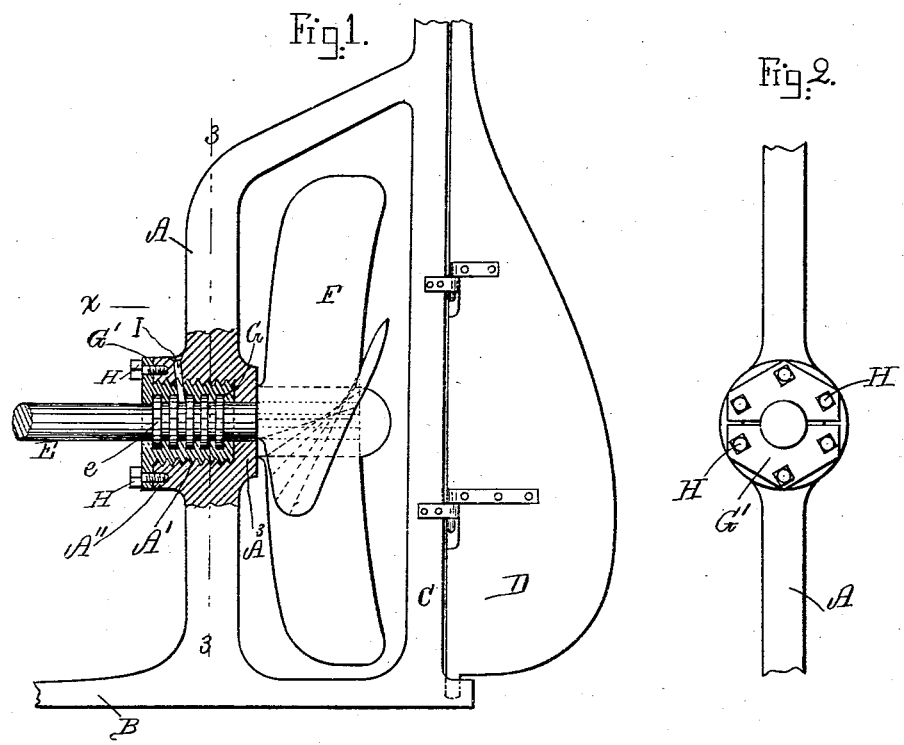
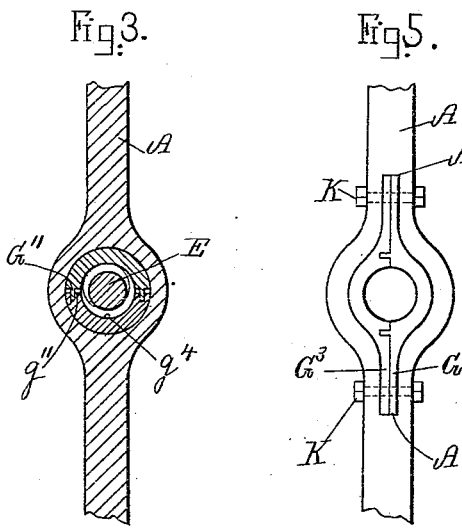
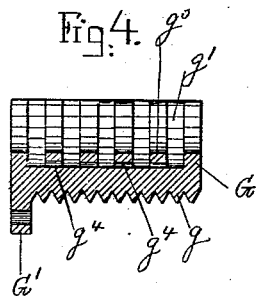
Witnesses.
Lauritz N. Möller
Mary C. Möller
Inventor.
William M. Campbell
by Alban Andrén
his atty.

UNITED STATES PATENT OFFICE.

WILLIAM M. CAMPBELL, OF CHELSEA, MASSACHUSETTS.

PROPELLER-SHAFT BEARING.

SPECIFICATION forming part of Letters Patent No. 563,134, dated June 30, 1896.

Application filed August 30, 1895. Serial No. 561,058. (No model.)

*To all whom it may concern:*

Be it known that I, WILLIAM M. CAMPBELL, a citizen of the United States, and a resident of Chelsea, in the county of Suffolk and State of Massachusetts, have invented new and useful Improvements in Propeller-Shaft Bearings, of which the following, taken in connection with the accompanying drawings, is a specification.
This invention relates to improvements in propeller-shaft bearings for steam ships or vessels; and it has for its object to prevent the propeller-shaft from longitudinal movement in its bearing caused by the action of the propeller; also, to prevent the water from entering the vessel at the place where the propeller-shaft goes through the stern-post, and holds the lubricant from escaping from the bearing, thus preventing the wearing of the propeller-shaft where it is journaled in the bearing.

The invention is carried out as follows, reference being had to the accompanying drawings, wherein—
Figure 1 represents a side elevation of the stern portion of a steam vessel, showing the improved bearing and its connection to the stern-post in section. Fig. 2 represents an end view seen from X in Fig. 1. Fig. 3 represents a vertical section on the line 3 3 shown in Fig. 1. Fig. 4 represents a detail sectional view of one of the improved bearing parts, and Fig. 5 represents an end elevation of a modification of the invention.
Similar letters refer to similar parts wherever they occur on the different parts of the drawings.

A represents the stern-post of a steam vessel, B the keel, and C the rudder-post, to which is hung the rudder D, as usual.

E is the propeller-shaft, to the outer rear end of which is secured the propeller F, as shown in Fig. 1.

The improved bearing is made in two semicircular parts G G, having polygonal flanges G' G' for turning it by means of a wrench or similar tool when securing it to or removing it from the stern-post A. Each semicircular part G is provided with an external screw-thread $g$, which is screwed into an internally-screw-threaded socket A' in the hub A" of the stern-post A, as shown in Fig. 1.

The bearings G G are provided with grooves $g'$ $g'$, adapted to receive the annular rings or projections $e$ $e$ on the propeller-shaft E, and with intermediate annular projections $g^3$, adapted to fit between the annular projections $e$ on the propeller-shaft E, as shown in Figs. 1 and 4.

The bearings G G, after being screwed into position within the socket A', are secured, preferably, by means of screw-bolts H H, going through perforations in the flanges G' G' and screwed into the inner end of the hub A", as shown in Figs. 1 and 2.

The rear ends of the bearings G G are made to rest against an annular shoulder $A^3$ in the rear end of the hub A", as shown in Fig. 1, so as to aid in securing the bearings within the socketed stern-post, and preventing water from entering at this place. In practice I prefer to provide one of said bearings G with longitudinal ribs or projections G" G", adapted to fit into corresponding grooves or recesses $g''$ $g''$, as shown in Fig. 3, so as to hold said semicircular bearings together while being screwed into or out of the screw-threaded socket in the stern-post A.

I, in Fig. 1, is an oil-hole going through the upper part of the hub A" and the upper bearing G for the purpose of oiling the propeller-shaft where it is journaled in the bearings G G.

For the purpose of evenly distributing the lubricant from one end to the other of the bearings I make longitudinal perforations $g^4$ $g^4$ through the lower portions of the ribs $g^3$ $g^3$ in the lower bearing G, as shown in Figs. 3 and 4, by means of which free communication is established from one groove $g'$ to the others in the series, thus insuring an even and perfect lubrication throughout the whole length of the bearings G.

In the modification shown in Fig. 5 the bearings instead of being externally screw-threaded are provided with elongated vertical wings $G^3$ $G^3$, adapted to fit into correspondingly-shaped recesses $A^4$ in the stern-post A and secured to the latter by means of fastening-bolts K K, as fully shown in said Fig. 5.

What I wish to secure by Letters Patent and claim is—

The combination with the stern-post A, of a vessel having an enlarged, internallythreaded socketed hub with a shoulder at the rear end of said socket and a contracted opening arranged centrally of the socketed hub and extending entirely through the latter, of a two-part shaft-bearing externally screw-threaded to fit the threaded socketed hub, longitudinal ribs or projections on one of said bearings which fit in corresponding grooves or recesses in the abutting bearing, said bearing being also provided on its interior with alternate annular grooves and projections and transverse orifices arranged through the projections of the lower part of the bearing for the passage of a lubricant, bolts passed through the flanged parts of said bearings and entering the hub, the propeller-shaft passing through said bearing and contracted opening in the hub and provided with alternate annular grooves and projections to engage the corresponding grooves and projections of the bearings, and a propeller mounted upon the end of said shaft, substantially as described.

In testimony whereof I have signed my name to this specification, in the presence of two subscribing witnesses, on this 15th day of November, A. D. 1894.

WILLIAM M. CAMPBELL.

Witnesses:
ALBAN ANDRÉN,
LAURITZ N. MÖLLER.